(12) United States Patent
Hidaka

(10) Patent No.: US 7,835,766 B2
(45) Date of Patent: Nov. 16, 2010

(54) PORTABLE TERMINAL DEVICE

(75) Inventor: Shinji Hidaka, Fussa (JP)

(73) Assignee: Casio Hitachi Mobile Communications Co., Ltd., Tokyo (JP)

(*) Notice: Subject to any disclaimer, the term of this patent is extended or adjusted under 35 U.S.C. 154(b) by 958 days.

(21) Appl. No.: 11/700,691

(22) Filed: Jan. 30, 2007

(65) Prior Publication Data

US 2007/0189502 A1 Aug. 16, 2007

(30) Foreign Application Priority Data

Jan. 30, 2006 (JP) ............................. 2006-021050

(51) Int. Cl.
*H04M 1/00* (2006.01)
(52) U.S. Cl. .............. 455/556.1; 455/435.1; 455/550.1; 709/355.01
(58) Field of Classification Search .............. 455/556.1, 455/557, 550.1, 551, 66.1, 461, 414.1, 435.1, 455/414.2, 435.2, 556.2; 709/203; 707/E17.115; 379/355.01
See application file for complete search history.

(56) References Cited

U.S. PATENT DOCUMENTS

| | | | | |
|---|---|---|---|---|
| 2002/0091754 A1* | 7/2002 | Jang et al. | .................... | 709/203 |
| 2008/0069086 A1* | 3/2008 | Shin et al. | .................... | 370/352 |
| 2009/0307380 A1* | 12/2009 | Lee et al. | ...................... | 710/14 |
| 2009/0307679 A1* | 12/2009 | Lee et al. | ..................... | 717/168 |
| 2010/0003999 A1* | 1/2010 | Park et al. | ................. | 455/452.2 |

FOREIGN PATENT DOCUMENTS

| | | |
|---|---|---|
| FR | 2 819 675 | 7/2002 |
| JP | 2003-018657 | 1/2003 |
| JP | 2003-189361 | 7/2003 |
| KR | 1020020019374 | 3/2002 |
| WO | WO 99/27731 | 6/1999 |

OTHER PUBLICATIONS

Korean Office Action issued in the corresponding foreign application No. 10-2007-0008023, along with English language translation thereof.
Search Report dated Jun. 6, 2007 issued for the corresponding European Patent Application No. 07 00 1628.

* cited by examiner

*Primary Examiner*—Pablo N Tran
(74) *Attorney, Agent, or Firm*—Cohen Pontani Lieberman & Pavane LLP

(57) ABSTRACT

In a situation where a plurality of "telephone numbers" as subscriber numbers and "fixed IDs" fixedly assigned to the "telephone numbers" in association with each other are stored and managed in a telephone number table, in a case where an arbitrary site is accessed using one of the "fixed IDs" as information on an accessing party, when registration of an "URL" of this site in a favorites table is instructed, a CPU registers one of the "fixed IDs", which is stored and managed in the telephone number table, in association with the "URL". When an access to the registered site is instructed thereafter, the CPU accesses the site using the "URL" associated with the registered site and the "fixed ID".

15 Claims, 11 Drawing Sheets

TELEPHONE NUMBER TABLE

| TELEPHONE TYPE | TELEPHONE NUMBER | MAIL ADDRESS | FIXED ID | SELECT FLAG |
|---|---|---|---|---|
| A | ...... | ...... | ..... | ○ |
| B | ...... | ...... | ..... | — |

FAVORITES TABLE

| SITE NAME | URL | FIXED ID |
|---|---|---|
|  |  |  |
|  |  |  |
|  |  |  |
|  |  |  |
|  |  |  |
|  |  |  |
|  |  |  |

FIG. 8

WEB MENU

1. FROM FAVORITES

2. FROM URL

3. END

FIG. 10

FAVORITES LIST

SITE A (BOLD)

SITE B (BOLD)

SITE C (THIN)

SITE D (THICK)

SITE E (YELLOW)

PORTABLE TERMINAL DEVICE

BACKGROUND OF THE INVENTION

1. Field of the Invention

The present invention relates to a portable terminal device which can access an arbitrary site on a network.

2. Description of the Related Art

There are cellular phone devices capable of using a plurality of telephone numbers as subscriber numbers. One of such cellular phone devices is a mobile communication terminal capable of registering a plurality of telephone numbers in a nearby base station to simultaneously wait for incoming calls to those telephone numbers, as disclosed in Unexamined Japanese Patent Application KOKAI Publication No. 2003-189361. The mobile communication terminal can simultaneously wait for incoming calls to a plurality of telephone numbers. In making a telephone call, the mobile communication terminal places a call using one of a plurality of telephone numbers. It is therefore necessary to select in advance which telephone number is to be used.

As disclosed in Unexamined Japanese Patent Application KOKAI Publication No. 2003-018657, a mobile communication system is known, in which physical areas corresponding to each of the phone numbers are registered in advance, thus allowing the user to separate the usage of the phone for business purpose or for private purpose. In this mobile communication system, separation of the multiple phone numbers is performed by a reception control on the server side for the selective usage of a plurality of telephone numbers. Achieving this control on a cellular phone requires that the cellular phone should be equipped with a global positioning system (GPS) so that it is capable to determine if the user is in the registered area to receive phone calls.

A cellular phone device capable of using a plurality of telephone numbers is equipped with telephone identification information (fixed ID) fixedly assigned beforehand to each of the telephone numbers. When accessing a Web site on the Internet, the cellular phone device selects one of the fixed IDs and uses it as information of the accessing party.

In accessing a site that requires payment or a site for registered users, user verification is performed every time. Even when the input password is verified properly, if a fixed ID used when registering for a membership differs from the one used in a later access, the user is regarded as a non-member and the use of the Web site, such as viewing the Web site, is not permitted. To avoid such an occurrence, the user may register to the same site using each of the fixed IDs. However, this requires multiple registration procedures.

If a plurality of fixed IDs assigned in association with respective telephone numbers are selectively used for business usage and private usage, the packet communication fees when using the Internet can be easily managed separately for business usage and private usage. However, it makes the operation of the cellular phone device cumbersome if the user needs to change a fixed ID for private use to a fixed ID for business use or vice versa every time the user accesses a Web site. This problem is not inherent to the case of selective use of multiple fixed IDs for business and private, but a similar problem would arise when using multiple fixed IDs in various occasions of a private use.

SUMMARY OF THE INVENTION

Accordingly, it is an object of the invention to provide a technique to allow a user to continuously use the original telephone ID information used to access a site when the site is revisited. This telephone ID information is respectively assigned to each of the telephone numbers as a part of the identification of the accessing party of the Web site.

To achieve the object, according to the first aspect of the invention, there is provided a portable terminal device comprising:

a telephone information memory unit that stores a plurality of telephone numbers assigned to the portable terminal device and plural pieces of telephone identification information respectively assigned to the telephone numbers in association therewith;

a memory unit that stores plural pieces of access destination information which respectively specify a plurality of sites on a network, and one of the plural pieces of telephone identification information stored in the telephone information memory unit in association therewith; and a site access unit that accesses a site on the network, wherein in accessing a site specified by the access destination information stored in the memory unit over the network, the site access unit accesses the site using the telephone identification information stored in the memory unit in association with the access destination information.

BRIEF DESCRIPTION OF THE DRAWINGS

These objects and other objects and advantages of the present invention will become more apparent upon reading of the following detailed description and the accompanying drawings in which:

FIG. 2 is a diagram for explaining a telephone number table 21;

FIGS. 4 to 7 are flowcharts illustrating the general operation of the cellular phone device which is initiated when the cellular phone device is powered on;

FIG. 8 is a diagram showing a Web menu screen;

FIG. 10 is a diagram showing a favorites list screen when a list mode is selected as a display mode.

DETAILED DESCRIPTION OF THE PREFERRED EMBODIMENT

A preferred embodiment of the present invention will now be described with reference to FIGS. 1 through 11. This embodiment is a portable terminal device being adapted to a cellular phone device.

Figure 1:
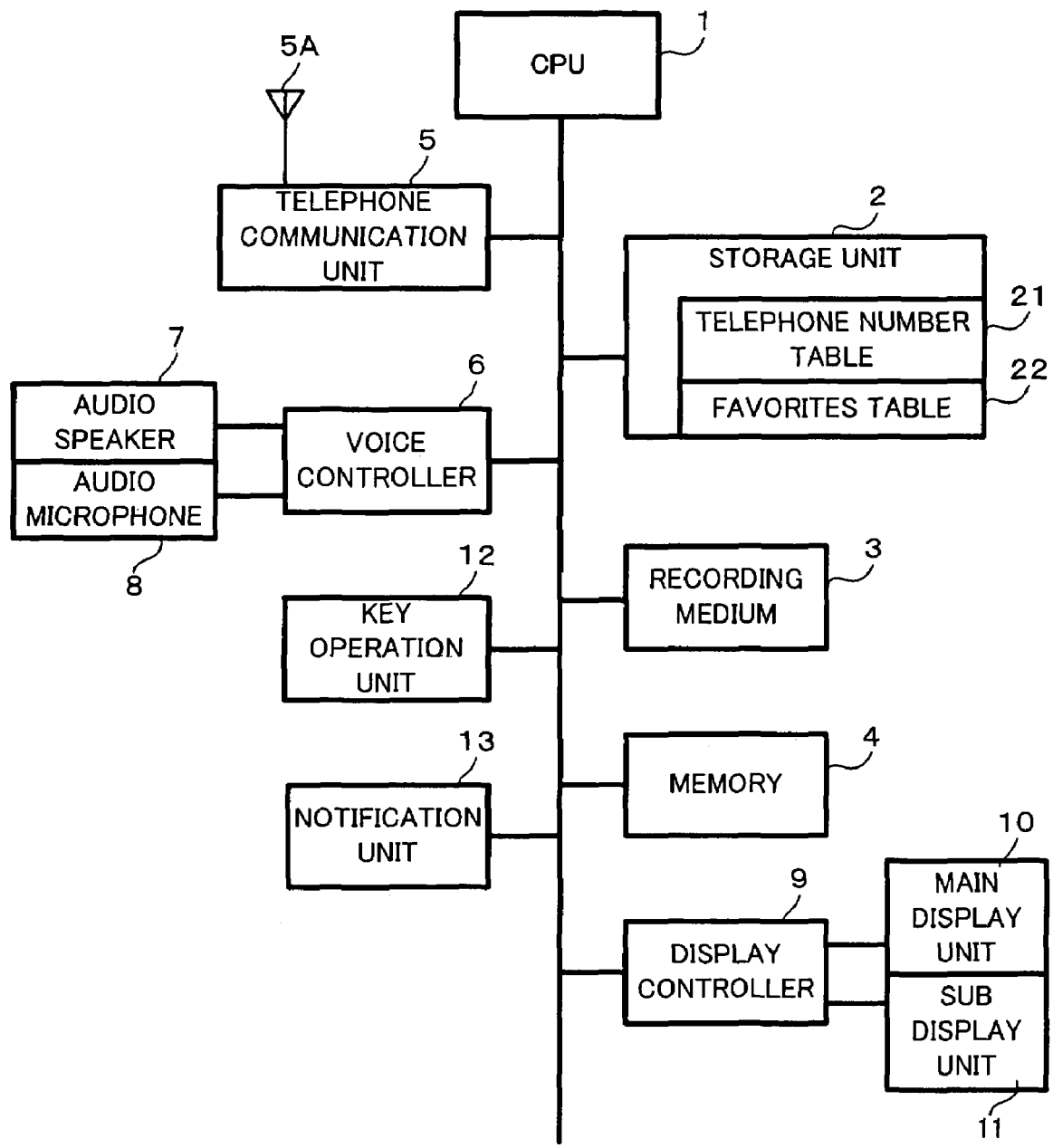
FIG. 1 is a block diagram showing the basic structural components of a cellular phone device adapted as a portable terminal device.

The basic structural components of the cellular phone device are illustrated in FIG. 1.

The functions that the cellular phone device has include a function to connect to the Internet, a function for sending/receiving e-mails, a function for a telephone communication as well as a "dual-telephone-number function" The dual-telephone-number function allows a plurality of telephone numbers (normally, two) stored as subscriber numbers. They can selectively be changed from one to another. When placing an outgoing call or receiving an incoming call, a currently-selected telephone number is used as an active number.

A CPU (Central Processing Unit) 1 controls the general operation of the cellular phone device according to various programs stored in a storage unit 2. The cellular phone device has a plurality of sub CPUs (not shown) in addition to the main CPU 1.

The storage unit 2 is a non-volatile memory (internal memory), such as a flash memory. The storage unit 2 has a program area and a data area. The program area stores the programs which achieve the embodiment according to the procedures in FIGS. 4 to 7 (discussed later). The data area stores information such as a telephone number table 21 and a favorites table 22 (both to be discussed later.)

A recording medium 3 is a mountable/dismountable portable memory. It comprises, for example, a smart medium, an IC card or the like. The recording medium 3 supplies image data, various other kinds of data, programs and so forth to the outside.

A memory 4 is an internal memory having a work area. The memory 4 comprises, for example, a DRAM (Dynamic Random Access Memory), SDRAM (Synchronous DRAM) or the like.

A telephone communication unit 5 first acquires a signal from the reception part of a transmission/reception unit (baseband unit) connected to a radio antenna 5A. Next, the telephone communication unit 5 demodulates the acquired signal to a reception baseband signal. The telephone communication unit 5 then outputs a voice from an audio speaker 7 via a voice controller 6.

The telephone communication unit 5 acquires voice data input from an audio microphone 8 through the voice controller 6. The telephone communication unit 5 encodes the acquired voice data to a transmission baseband signal. Then, the telephone communication unit 5 sends the transmission baseband signal to the transmission part of the transmission/reception unit. The transmission baseband signal is transmitted from the antenna 5A.

The telephone communication unit 5 also receives display data using the e-mail function and the Internet connecting function. The display data is displayed on a main display unit 10 having an LCD (Liquid Crystal Display) or so via a display controller 9.

The main display unit 10 displays information such as high-definition display of text, image data, and various messages. A sub-display unit 11, provided at the rear side of the main body of the cellular phone device, displays a current date, simple messages, icons, etc.

A key operation unit 12 is used to input numbers, characters, commands and so forth. The CPU 1 executes a process according to a key input from the key operation unit 12. A notification unit 13 has a speaker, an LED (Light Emitting Diode), and a vibrating motor, for notifying an incoming call or the like. The notification unit 13 becomes active to give an alarm as well as to notify signal reception when receiving telephone calls and/or e-mails.

The telephone number table 21 will now be described referring to FIG. 2.

For each of the telephone-number classes A and B the telephone number table 21 stores a "telephone number", a "mail address", a "fixed ID", and a "select flag". The "telephone numbers" for class A and B are subscriber numbers stored for the dual-telephone-number function of the device. For example, it is possible to use the telephone number class A for "business use" and the telephone number class B for "private use". Each of the telephone number classes A and B has local address for e-mails and they are labeled as "Mail addresses" in the telephone number table 21. A plurality of mail addresses may be set for each of the telephone number classes A and B.

The "fixed ID" is telephone ID information fixedly assigned to each of the telephone numbers beforehand. Two fixed IDs are set, each in association with the telephone number classes A and B. When accessing a Web site on the Internet, the CPU 1 selects one of the two fixed IDs. The selected fixed ID is used as a part of information of the accessing party when accessing a Web site. The "select flag" indicates which one of the two telephone numbers is currently selected as an active number. In FIG. 2, the circle shows the "select flag" being ON indicating the active number.

Figure 3:
FIG. 3 is a diagram for explaining a favorites table 22.
Figure 4:
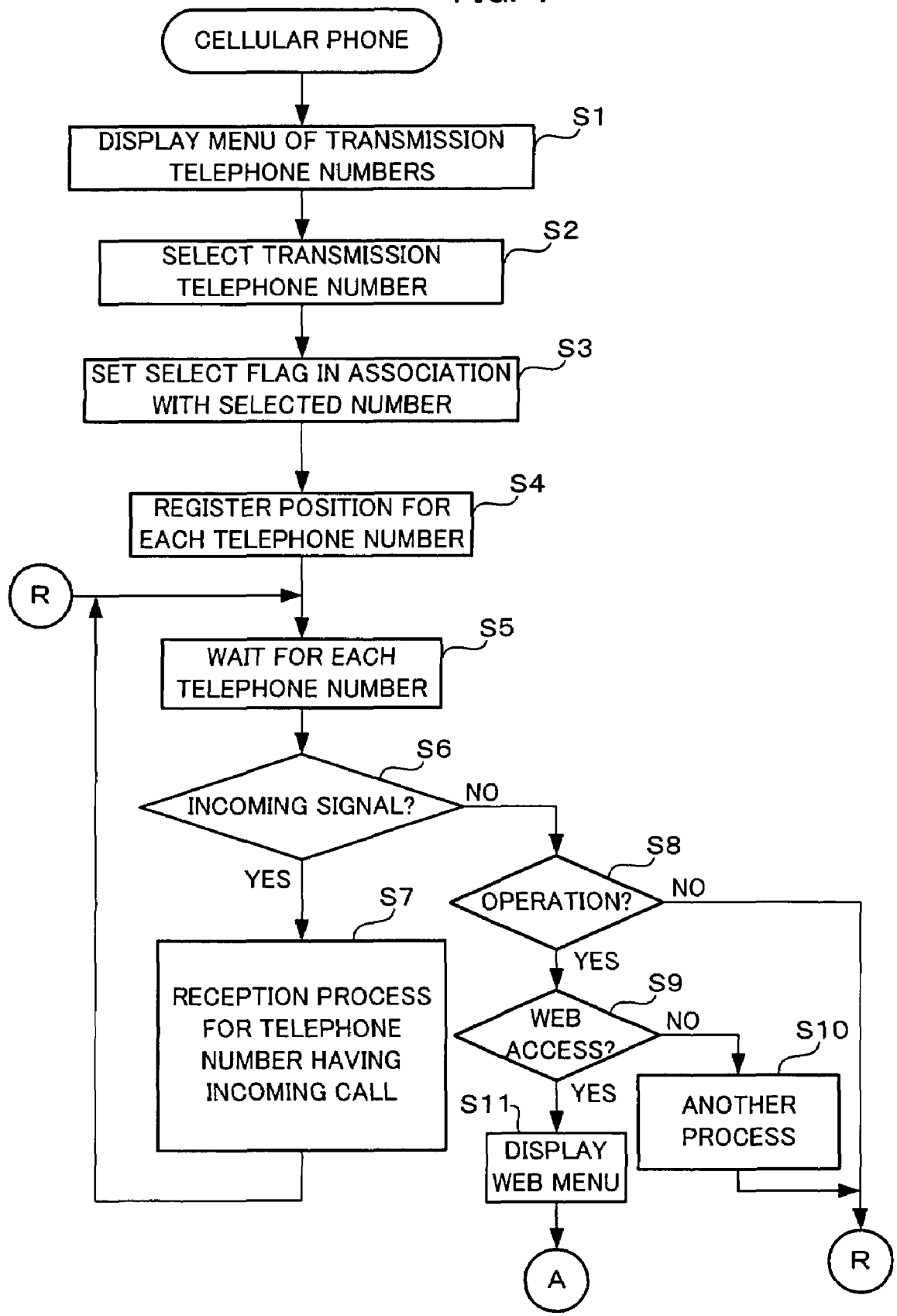

The favorites table 22 will now be described referring to FIG. 3.

The favorites table 22 provides a bookmark function to register the URLs (Uniform Resource Locators) or the like of the frequently-accessed Web sites. The favorites table 22 stores a "site name", an "URL" and a "fixed ID" for each registered site. The "fixed ID" is the one used for accessing the registered site. It is possible to select whether or not to register a "fixed ID" for each "URL". One of the "fixed IDs" for the telephone number classes A and B is registered as needed.

When site names from the favorites table 22 are displayed, the CPU 1 checks for the display mode selected by the user. There are two different modes to display site names from the favorites table 22 on to the main display unit 10. The list mode displays the whole list of the registered site names at once. On the other hand, the classification mode first classifies the list according to the fixed IDs and displays the classification, then lists the respective part from the entire list of the registered site names according to the user input. Registered site names are displayed in the selected mode. When any registered site name is selected from the displayed list and an access thereto is instructed, the CPU 1 reads the "URL" and "fixed ID" both corresponding to the site name from the favorites table 22. Access to the Web site is executed using the "URL" and the "fixed ID".

The operational concept of the cellular phone device having the Internet connecting function according to the embodiment will be explained referring to flowcharts illustrated in FIGS. 4 to 7. The individual functions described in the flowcharts are stored in the form of computer readable program codes. Operations according to the program codes are executed one after another on the cellular phone device. The program codes may be transferred via a transfer medium. In this case, operations according to the transferred program codes can be executed one after another on the cellular phone device. That is, the unique operations of the embodiment can be executed using programs and/or data supplied externally via a transfer medium besides the recording medium.

FIGS. 4 to 7 are the flowcharts to illustrate the general operation of the cellular phone device. The operation is initiated when the cellular phone device is powered on.

First, when the cellular phone device is powered on, the CPU 1 displays a selection menu on the main display unit 10 (step S1). It allows the user to select a "telephone number" to be used as a transmission telephone number from the two telephone numbers stored in the telephone number table 21. The user selects one of the "telephone numbers" on the menu screen as a transmission telephone number (step S2). The CPU 1 lets the transmission telephone number be a currently available active number. The "select flag" is set in the telephone number table 21 in association with the transmission telephone number (step S3).

The CPU 1 registers a current position of the device, and responds thereto, from a nearby base station while activating the telephone communication unit 5 to transmit radio waves from the antenna 5A. The position of the base station with the highest radio wave intensity is registered as a current position in a data base of an exchange side for each telephone number (step S4). This results in the cellular phone device being "stand by" for a transmission/reception of the signal for each telephone number (step S5).

When detecting an incoming telephone call or the reception of an e-mail (step S6: YES), the CPU 1 checks which one of the telephone number classes A and B is the destination. Then, the CPU 1 processes the incoming call or the e-mail based on the "telephone number" or "mail address" corresponding to the destination (step S7). Thereafter, the CPU 1 returns to step S5 to stand by for a transmission/reception signal.

In the standby mode, when detecting any operation (step S8: YES), the CPU 1 checks if a Web access is instructed (step S9). When there is an instruction other than the one for a Web access (step S9: NO), a process corresponding to the instruction is executed (step S10). Thereafter, the CPU 1 returns to step S5 to stand by for a transmission/reception signal. Processes corresponding to the instruction include, for example, a mail creating process, a registration procedure for a member-only site, and an entry of a password.

Figure 8:
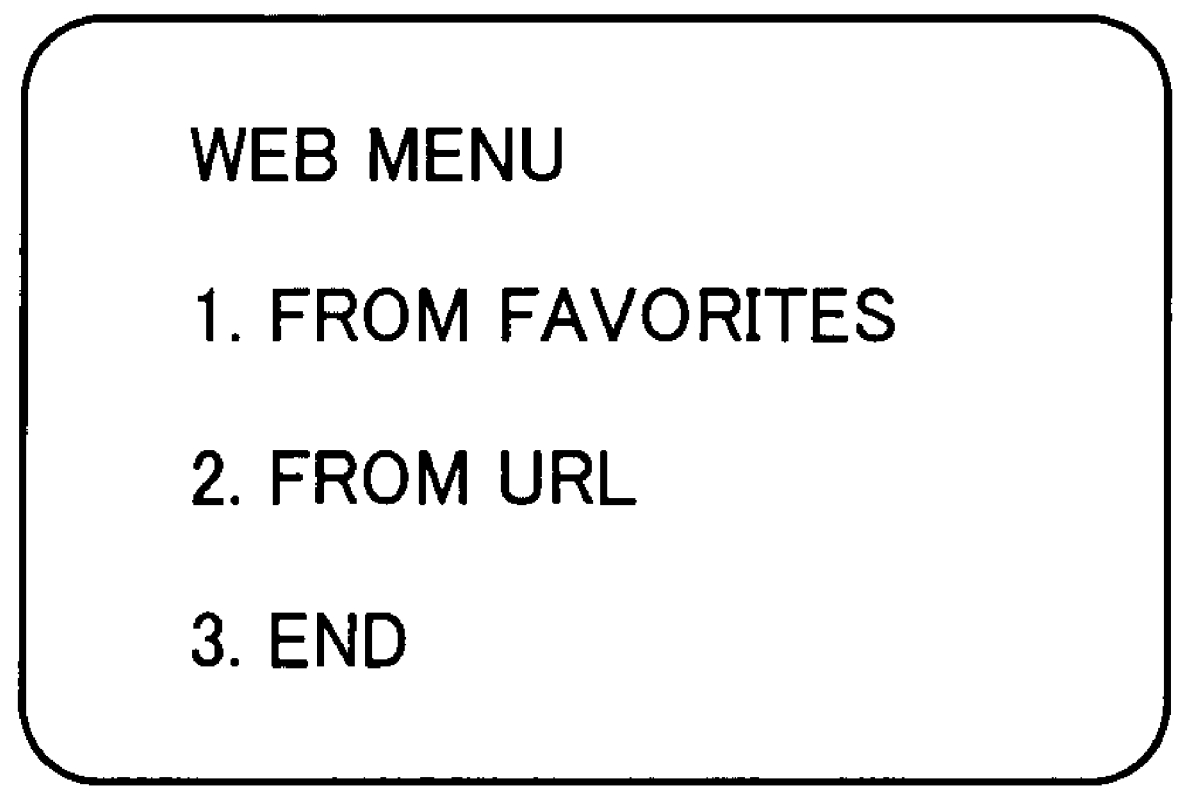

When a Web access is instructed (step S9: YES), a Web menu is displayed (step S11). FIG. 8 shows the Web menu screen. The screen shows items, such as "From Favorites", "From URL" and "End". The "From Favorites" is a menu item to access a Web site chosen from "URLs" registered in the favorites table 22. The "From URL" is a menu item to access a Web site based on the "URL" input by the user operation. The "End" terminates site accessing.

Figure 5:
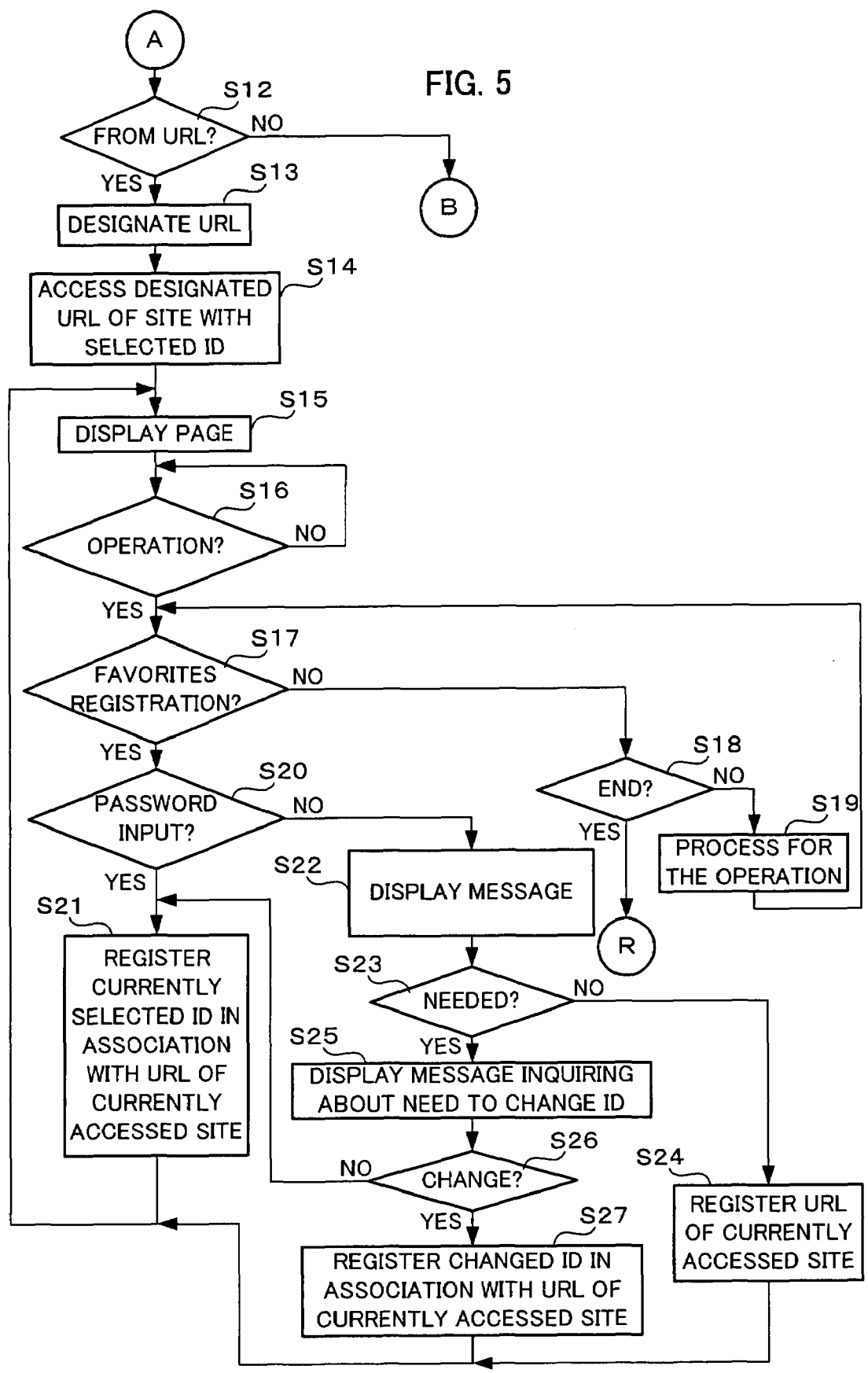

When the menu item "From URL" is selected on the Web menu screen (step S12 in FIG. 5: YES), the user inputs and designates an arbitrary "URL" (step S13). The CPU 1 reads from the telephone number table 21 a "fixed ID" corresponding to the active telephone number currently selected for transmission from the telephone number classes A and B. Then, the CPU 1 sends the read "fixed ID" and the input "URL" to an ISP (Internet Service Provider), and accesses the site (step S14). The CPU 1 receives the contents of the Web page sent in response to the process. The CPU 1 displays the contents of the page on the main display unit 10 (step S15). Thereafter, the cellular phone device stands by for an operation (step S16).

With the received page being viewed, when any operation is performed, the CPU 1 checks if the operation instructs to register the viewed page as a favorite site (step S17). When another operation is instructed (step S17: NO), the CPU 1 checks if the item "End" in the Web menu screen is selected (step S18). When it is not an instruction to terminate the site accessing (step S18: NO), the Web page is, for example, saved or printed as a process corresponding to the operation (step S19). When the termination is instructed (step S18: YES), the CPU 1 returns to step S5 in FIG. 4 so that the cellular phone device stands by for a transmission/reception signal.

When a favorite registration is instructed (step S17: YES), the CPU 1 checks if the site is a pay site that requires an entry of a password (step S20). When the site is a pay site or so which needs user verification based on an input password, the CPU 1 registers the "site name", "URL" and "fixed ID" in the favorites table 22 in association with one another (step S21). This step S21 includes acquisition of the "site name" and "URL". The step S21 further includes reading a currently-selected telephone number as a transmission telephone number. It is equivalent to read a "fixed ID" corresponding to the telephone number with the set "select flag" from the telephone number table 21.

When the site does not demand any password entry (step S20: NO), the CPU 1 inquires of the user whether or not to register the "fixed ID" together with the "site name" and "URL" in the favorites table 22. A confirmation message for this inquiry is displayed (step S22). When no registration is instructed (step S23: NO), only the "site name" and "URL" of the current accessed site are registered in the favorites table 22 (step S24). When registration of the "fixed ID" is instructed (step S23: YES), on the other hand, the CPU 1 inquires of the user whether or not to change the "fixed ID" corresponding to the currently-selected telephone number to another "fixed ID". A confirmation message for this inquiry is displayed (step S25).

When changing the "fixed ID" is not instructed in response to the confirmation message displayed (step S26: NO), the CPU 1 shifts to the step S21. That is, the "fixed ID" corresponding to the currently selected telephone number is registered in the favorites table 22 in association with the "site name" and "URL". When changing the "fixed ID" is instructed (step S26: YES), the CPU 1 changes the "fixed ID" corresponding to the currently selected telephone number to another "fixed ID". Then, the CPU 1 registers the changed "fixed ID" in the favorites table 22 in association with the "site name" and "URL" (step S27). Thereafter, the CPU 1 returns to step S15 and execute the above-described operation until the termination of site accessing is detected in step S18.

Figure 6:
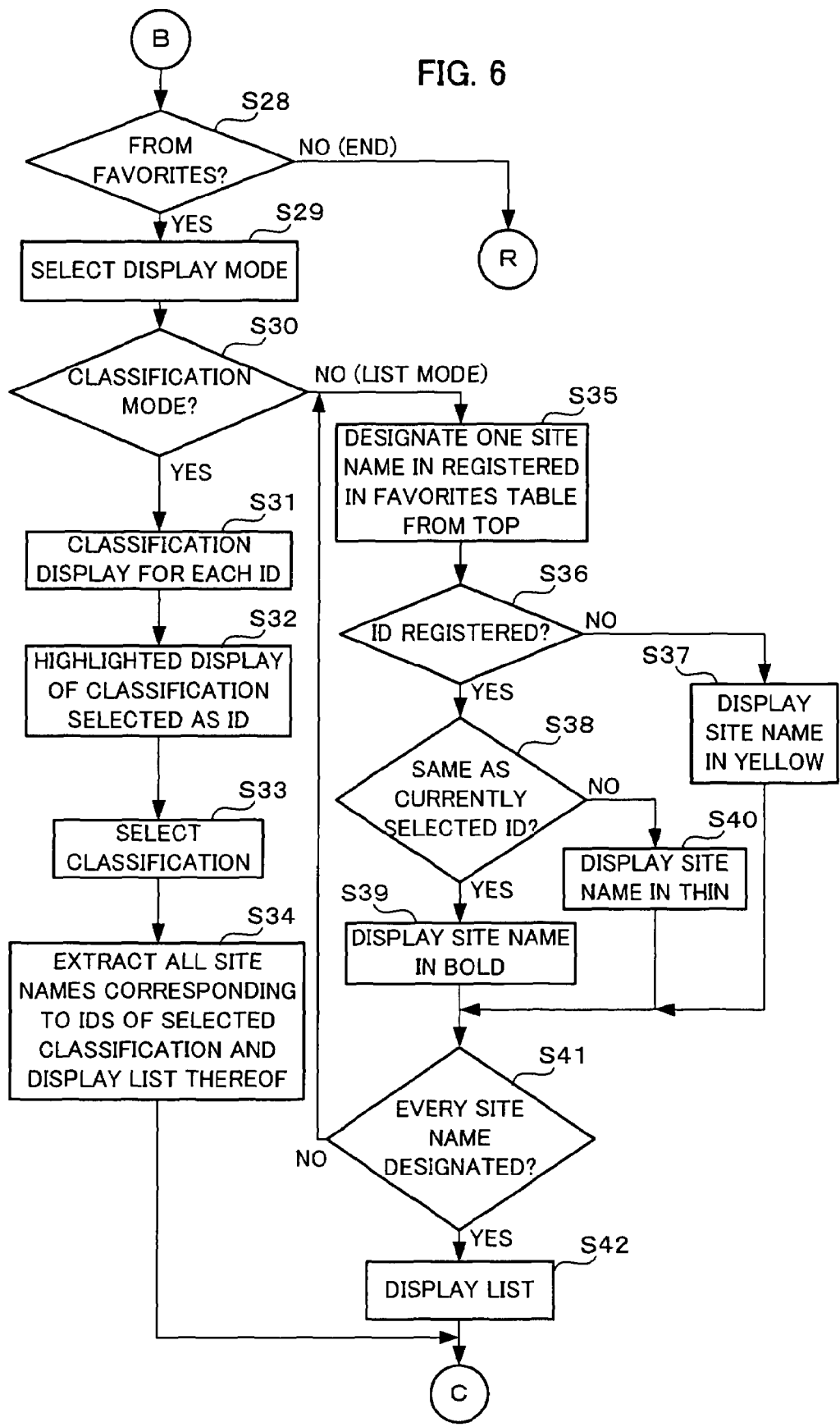

When the menu item "From Favorites" is selected on the Web menu screen (step S28 in FIG. 6: YES), the following steps are executed (FIG. 6).

First, one of the display modes to display a list of the registered site names in the favorites table 22 is selected by the user input (step S29). As already described, the first mode, the list mode, displays the whole list of the registered site names at once, while second mode, the classification mode, classifies the list in accordance with the fixed IDs, displays the classification, and lists the respective part from the whole list. Next, the selected display mode is determined (step S30). When the classification mode is selected as the display mode (step S30: YES), the registered site names in the favorites table 22 are classified for each "fixed ID", and the classification is displayed (step S31).

Figure 9A:
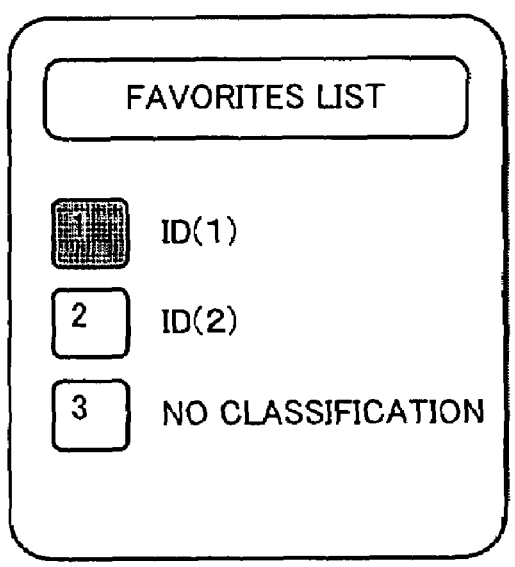
FIG. 9A is a diagram showing a classification when displaying the names of the registered sites in the favorites table 22 for each "fixed ID"

FIG. 9 shows a case where site names registered in the favorites table 22 are classified for each "fixed ID" and displayed in that form. FIG. 9(A) shows a list of classification names. The list includes "1: Classification of ID (1)", "2: Classification of ID (2)", and "3: No Classification".

Figure 9B:
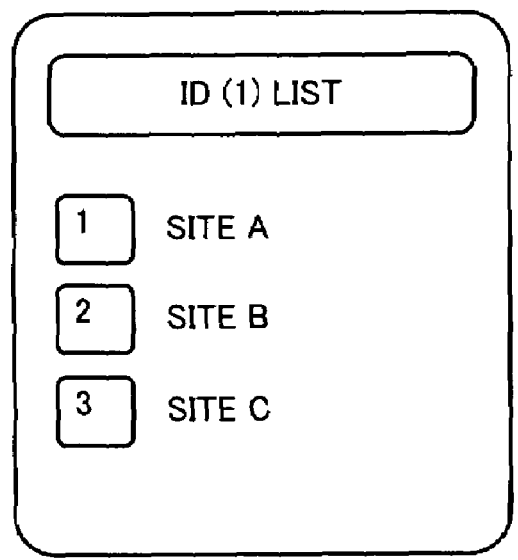
FIG. 9B is a diagram showing a list of the names of the registered sites in the selected classification.

The CPU 1 highlights the classification item to indicate a classification item corresponding to the "fixed ID" of the currently-selected telephone number (step S32). In the example of FIG. 9(A), the item "1: Classification of ID (1)" (hatched in FIG. 9(A)) is highlighted. This indicates that the telephone number corresponding to the highlighted ID is an active number currently selected. When an arbitrary classification item is selected on the classification name list screen (step S33), all of the registered site names in the selected classification are read out and a list thereof is displayed. FIG. 9(B) shows a list screen showing a list of registered site names (site A, site B, . . . , site D) in the selected classification.

When the selected display mode is the list mode (step S30: NO), a "site name" at the top of the favorites table 22 is designated (step S35). Simultaneously, it is determined whether or not the "fixed ID" is registered in association with the designated site name (step S36). When the "fixed ID" is not registered (step S36: NO), the "site name" is displayed in color (in yellow) (step S37). When the "fixed ID" is registered (step S36: YES), it is checked if the registered "fixed ID" is the same as the "fixed ID" corresponding to the currently selected telephone number (step S38). When the "fixed IDs" are identical to each other, the "site name" is displayed in bold (step S39). When the "fixed IDs" differ from each other, the "site name" is displayed in thin (step S40).

Next, the CPU 1 checks if all the site names registered in the favorites table 22 have been designated (step S41). The CPU 1 returns to step S35 to designate a next "site name" until every site name is designated. Thereafter, while designating the "site names" one by one, the CPU 1 determines whether to display each "site name" in yellow, bold or thin, and displays the "site names" in an identifiable manner. As a result, a list screen as shown in FIG. 10 is displayed (step S42). FIG. 10 is a diagram showing a favorites list screen when the list mode is selected as the display mode.

Figure 7:
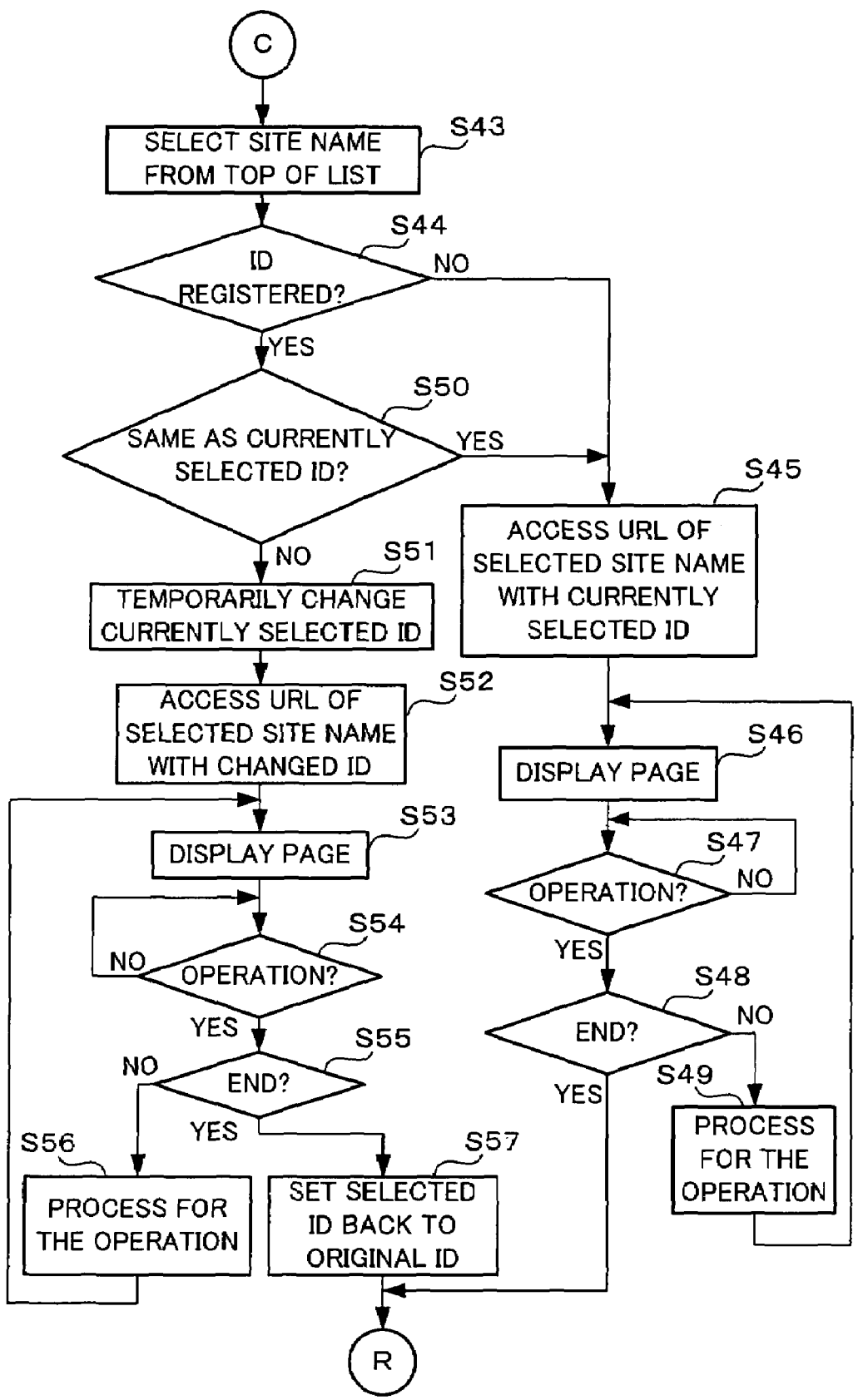

The steps in the flowchart in FIG. 7 will be explained next.

First, with the list screen as shown in FIG. 9(B) or FIG. 10 being displayed, an arbitrary "site name" is selected on the list screen (step S43). Next, it is determined whether or not a "fixed ID" is registered in association with the selected site name (step S44).

When the "fixed ID" is not registered, the CPU 1 goes to step S45 to read the "URL" corresponding to the selected site name from the favorites table 22 and access a site with the "URL". At this time, the CPU 1 reads the "fixed ID" corresponding to the currently selected telephone number and sends the "fixed ID" as telephone ID information to the connected provider. Thereafter, as done in the case of the normal site accessing, the CPU 1 displays a received Web page contents (step S46), and then stands by for an operation (step S47). When the termination of the site accessing is instructed (step S48), the CPU 1 returns to step S5 in FIG. 4 to stand by for a transmission/reception signal. If the user's operation instructs a process other than the termination, a process corresponding to this operation is executed (step S49).

When the "fixed ID" is registered in association with the selected site name (step S44: YES), the CPU 1 checks if the "fixed ID" is identical to the "fixed ID" corresponding to the currently-selected telephone number (step S50). When both "fixed IDs" are identical, the CPU 1 moves to the step S45 and proceeds with the same process as done in the case where the "fixed ID" is not registered. That is, the "fixed ID" corresponding to the currently-selected telephone number is sent to the connected provider.

When the "fixed IDs" differ from each other (step S50: NO), the currently-selected telephone number is temporarily changed to another telephone number (step S51). If the telephone number for the telephone number class A is currently selected, for example, the "select flag" is temporarily set for the telephone number for the telephone number class B. This achieves switching of the telephone number. Thereafter, the CPU 1 reads the "URL" corresponding to the selected site name from the favorites table 22 and access a site with the "URL". In this case, the "fixed ID" corresponding to the temporarily changed telephone number is transmitted as the telephone ID information (step S52).

Upon reception of a Web page, the CPU 1 displays the contents of the page (step S53) and stands by for an operation (step S54). When some operation is performed in this situation, the CPU 1 determines whether the operation instructs termination or not (step S55). When the termination is instructed, the CPU 1 sets the temporarily changed telephone number to the original one (step S57), then returns to step S5 in FIG. 4 to stand by for a transmission/reception signal. If the user operation performed is other than the termination-instructing operation, a process corresponding to this operation is executed (step S56).

In the situation where a plurality of "telephone numbers" as subscriber numbers and "fixed IDs" assigned beforehand in association with the respective telephone numbers are stored in the telephone number table 21, if an arbitrary site is accessed using one of the "fixed IDs" as information of the accessing party and is a pay site or so which needs user verification based on an input password, the CPU 1 registers the "fixed ID" used at the time of accessing the site in association with the "URL" thereof when registration of the "URL" of the site in the favorites table 22 is instructed. Thereafter, when accessing the registered site, the CPU 1 does so using the "URL" and "fixed ID" associated with the registered site.

Figure 11:
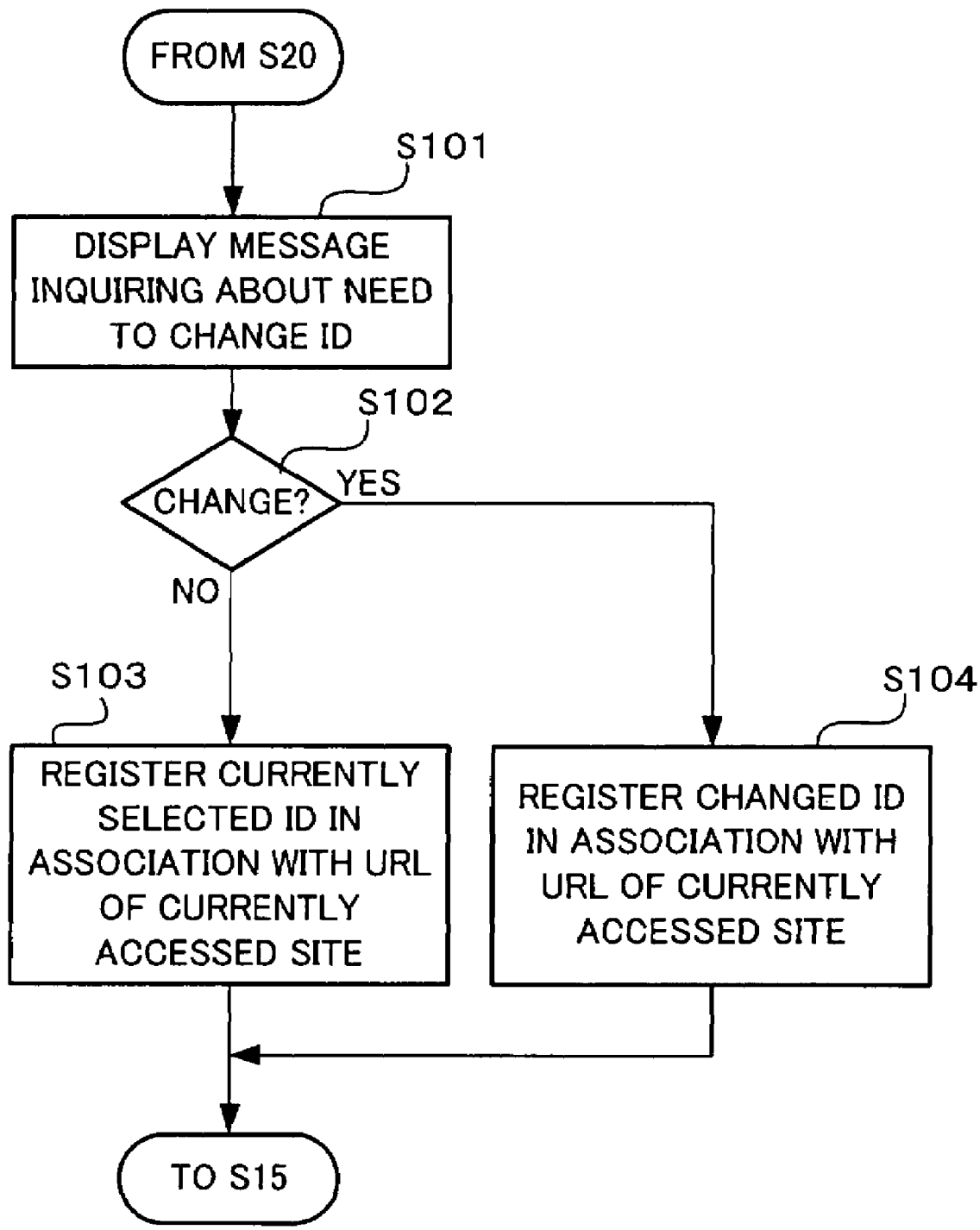
FIG. 11 is a flowchart which can be inserted between step 20 and step 21 in the flowchart in FIG. 5 according to one embodiment of the present invention.

On the other hand, the CPU 1 can be provided with a function which inquires of a user whether or not to change the "fixed ID" corresponding to the currently-selected telephone number to another "fixed ID" when it is instructed to register the "URL" of a site in the favorites table 22. An operation in this case is illustrated in FIG. 11. In this case, the flowchart illustrated in FIG. 11 is inserted between step S20 and step S21 in the flowchart illustrated in FIG. 5. In other words, when registration to the favorites table 22 is instructed (step S17: YES), the CPU 1 checks if the site is a pay site which requires an entry of a password (step S20). When the site is a pay site or so which needs user verification based on an input password (step S20: YES), the CPU 1 inquires of the user whether or not to change the "fixed ID" corresponding to the currently-selected telephone number to another "fixed ID". A confirmation message for this inquiry is displayed (step S101).

When changing the "fixed ID" is not instructed in response to the confirmation message displayed (step S102: NO), the CPU 1 registers the "fixed ID" corresponding to the currently-selected telephone number in the favorites table 22 in association with the "site name" and "URL" (step S103).

When it is instructed to change the "fixed ID" (step S102: YES), the CPU 1 changes the "fixed ID" corresponding to the currently-selected telephone number to another "fixed ID". Then, the CPU 1 executes a process of registering the changed "fixed ID" in the favorites table 22 in association with the "site name" and "URL" (step S104).

In either case where changing the "fixed ID" is instructed or not, after the unchanged "fixed ID" or the changed "fixed ID" is registered in the favorites table 22 in association with the "site name" and "URL", the CPU 1 returns to step S15 as shown in FIG. 11.

The "fixed ID" registered when accessing an arbitrary site can be used continuously every time the site is accessed. That is, it is unnecessary to perform an operation to switch the "fixed ID" every time a site is accessed. Because the desired "fixed ID" can be used in accessing a site, the site accessing can reflect the user's intention.

In accessing a member-only site, for example, the "fixed ID" used at the time of registration for a membership can be used continuously thereafter. Therefore, a plurality of "fixed IDs" can be selectively used for business usage and private usage, for example, thus making it easier to manage payment of packet communication fees.

In accessing a site registered in the favorites table 22, the CPU 1 compares the currently-available "fixed ID" with the "fixed ID" corresponding to the registered site. When a mismatch between the two fixed IDs is detected, the CPU 1 temporarily selects the "fixed ID" corresponding to the registered site as active information. Therefore, the same site can be accessed using the same "fixed ID" without requiring a special operation.

When displaying the contents of the favorites table 22, it is possible to select the list mode for displaying a list of the site names of registered sites or the classification mode for displaying classified site names for each "fixed ID". The site names are displayed in the designated display mode. That is, the site names can be displayed in the list mode as well as the classification mode. This feature is convenient, for example, when a plurality of "fixed IDs" are selectively used for business usage and private usage. When displaying a list of site names, whether or not a "fixed ID" is registered in association with each site is displayed in an identifiable manner. This makes it possible to identify whether a target site is to be accessed using a single "fixed ID" or using either of the "fixed ID"s. When site names are displayed in a classified manner, the classification corresponding to the currently-available "fixed ID" is distinguishably highlighted.

In the embodiment, the favorites table 22 is configured to store a "site name", a "URL" and a "fixed ID" in association with one another. As a modification, a favorites table may be provided for each of classifications of the "fixed IDs". And "site names" and "URLs" may be stored in each classification table. That is, a favorites table classified for "fixed IDs" corresponding to the telephone number class A and a favorites table classified for "fixed IDs" corresponding to the telephone number class B may be provided separately so that "site names" and "URLs" are stored in each favorites table.

In the embodiment, "telephone numbers", "mail addresses", "fixed IDs", etc. are stored in the telephone number table 21 for each of the telephone number classes A and B. As a modification, a plurality of UIM (User Identity Module) cards may be connected in a mountable/dismountable manner, so that subscriber telephone numbers, "fixed IDs", "telephone communication fees", and so forth are stored and managed in the UIM cards. In addition, with the list mode or the classification mode being selected as the display mode, the condition and/or the method for distinguishably displaying a list of preferred site names are optional.

The invention is not limited to a cellular phone device, but can be adapted to portable terminal devices, such as a PDA with the Internet connecting function, an electronic camera, an electronic wristwatch and a music player.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-021050 filed on Jan. 30, 2006 and including specification, claims, drawings and summary. The disclosure of the above Japanese Patent Application is incorporated herein by reference in its entirety.

What is claimed is:

1. A portable terminal device comprising:
a telephone information memory unit that stores a plurality of telephone numbers assigned to the portable terminal device and plural pieces of telephone identification information respectively assigned to the telephone numbers in association therewith;
a memory unit that stores plural pieces of access destination information which respectively specify a plurality of sites on a network, and one of said plural pieces of telephone identification information stored in the telephone information memory unit in association therewith;
a site access unit that accesses a site on the network; and
a registration unit that registers one of said plural pieces of access destination information specifying the site accessed by the site access unit, and one of said plural pieces of telephone identification information in association with each other;
wherein in accessing a site specified by the access destination information stored in the memory unit over the network, the site access unit accesses the site using the telephone identification information stored in the memory unit in association with the access destination information.

2. The portable terminal device according to claim 1, further comprising:
an active information designation unit that designates one of said plural pieces of telephone identification information stored in the telephone information memory unit as active information available at the time, and
wherein the registration unit registers, in the memory unit, that piece of said plural pieces of telephone identification information stored in the telephone information memory unit which is designated as the active information by the active information designation unit, and the access destination information accessed at the time by the site access unit in association with each other.

3. The portable terminal device according to claim 1, wherein the registration unit registers the access destination information specifying the site accessed by the site access unit, and one of said plural pieces of telephone identification information stored in the telephone information memory unit which is used when accessing the site, in the memory unit in association with each other.

4. The portable terminal device according to claim 1, further comprising:
a selection unit that selects one telephone identification information which is to be registered in the memory unit from said plural pieces of telephone identification information stored in the telephone information memory unit in response to a user's operation;
wherein the registration unit registers the access destination information specifying the site accessed by the site access unit, and the telephone identification information selected by the selection unit in the memory unit in association with each other.

5. The portable terminal device according to claim 1, wherein the registration unit includes:
a specific-site determination unit that determines whether or not the site accessed by the site access unit is a specific site which meets a predetermined condition; and
a unit that registers the telephone identification information used in accessing the site together with the access destination information of the site in the memory unit when the site is determined as the specific site by the specific-site determination unit.

6. The portable terminal device according to claim 1, further comprising:
an instruction unit that instructs whether or not to register the access destination information of currently accessing site and the telephone identification information stored in the telephone information memory unit in association with each other in response to a user's operation;
wherein when the instruction unit has instructed to register the telephone identification information, the registration unit registers the access destination information specifying the site accessed by the site access unit, and the telephone identification information used in accessing the site, in the memory unit in association with each other.

7. The portable terminal device according to claim 1, further comprising:
an instruction unit that instructs whether or not to register the access destination information of currently accessing site and the telephone identification information stored in the telephone information memory unit in association with each other in response to a user's operation; and
wherein when the instruction unit has instructed to register the telephone identification information, the registration unit registers the access destination information specifying the site accessed by the site access unit, and one of the said plural pieces of telephone identification information stored in the telephone information memory unit in association with each other.

8. The portable terminal device according to claim 1, further comprising:
an instruction unit that instructs whether or not to register the access destination information of currently accessing site and the telephone identification information stored in the telephone information memory unit in association with each other in response to a user's operation; and
wherein when the instruction unit has instructed to register the telephone identification information, the registration unit registers the access destination information of the site in the memory unit without being associated with the telephone identification information.

9. The portable terminal device according to claim 1, further comprising:
an active information designation unit that designates one of said plural pieces of telephone identification information stored in the telephone information memory unit as active information available then; and
wherein the site access unit includes:
a determination unit that determines whether or not the telephone identification information designated as the active information by the active information designation unit coincides with the telephone identification information stored in association with the access destination information in the memory unit, at a time of accessing the site specified by the access destination information stored in the memory unit; and
a temporary designation unit that temporarily designates, as the active information, the telephone identification information stored in association with the access destination information in the memory unit when the determination unit determines that both of the telephone identification information do not coincide with each other.

10. The portable terminal device according to claim 1, further comprising:
a designation unit that designates one display mode from either a list display mode for displaying a list of the access destination information stored in the memory unit or a classification display mode for presenting hierarchical display of the access destination information classified for each telephone identification information registered in the memory unit; and
a display unit that displays said plural pieces of access destination information stored in the memory unit in the display mode designated by the designation unit.

11. The portable terminal device according to claim 10, wherein when the designation unit designates the list display mode for displaying a list of the access destination information stored in the memory unit, the display unit displays each site in such a mode as to permit a user to be able to identify which one of said plural pieces of telephone identification information is registered for that site.

12. The portable terminal device according to claim 10, further comprising:
an instruction unit that instructs whether or not to register the access destination information of currently accessing site and the telephone identification information stored in the telephone information memory unit in association with each other in response to a user's operation; and
wherein when the instruction unit has instructed not to register the telephone identification information, the registration unit registers the access destination information of the site in the memory unit without associating with the telephone identification information; and
wherein when the designation unit designates the list display mode for displaying a list of the access destination information stored in the memory unit, the display unit displays each site in such a mode as to permit a user to be able to identify which one of said plural pieces of telephone identification information is registered for that site or none of the telephone identification information is registered for that site.

13. The portable terminal device according to claim 10, further comprising:
an active information designation unit that designates one of said plural pieces of telephone identification information stored in the telephone information memory unit as active information currently available;
wherein when the designation unit designates the classification display mode for presenting hierarchical display of the access destination information classified for each telephone identification information registered in the memory unit, the display unit displays the access destination information registered in the memory unit in association with the telephone identification information designated as active by the active information designation unit in such a mode as to permit a user to identify the access destination information.

14. A site access method comprising:
a step of storing plural pieces of telephone identification information;
an information storing step of storing plural pieces of access destination information which respectively specify a plurality of sites on a network, and one of said plural pieces of telephone identification information in association therewith;
registering, by a registration unit, one of said plural piece of access destination information specifying a site for access by a site access unit, and one of said plural pieces of telephone identification information in association with each other; and
an access step of accessing a site specified by one of said plural pieces of access destination information stored in the information storing step by using the telephone identification information stored in association with the access destination information at a time of accessing the site over the network.

15. A non-transitory recording medium storing a program that allows a computer to achieve:
a telephone information storing function of storing plural pieces of telephone identification information;

a storing function of storing plural pieces of access destination information which respectively specify a plurality of sites on a network, and one of said plural pieces of telephone identification information stored by the telephone information storing function in association therewith;

a site access function of accessing a site on a network; and a registering function of registering one of said plural pieces of access destination information specifying the site accessed by the site access function, and one of said plural pieces of telephone identification information in association with each other;

wherein at a time of accessing a site specified by one of said plural pieces of access destination information stored by the storing function over the network, the site access function accesses the site using the telephone identification information stored in association with the access destination information by the storing function.

* * * * *